United States Patent Office 3,324,316
Patented June 6, 1967

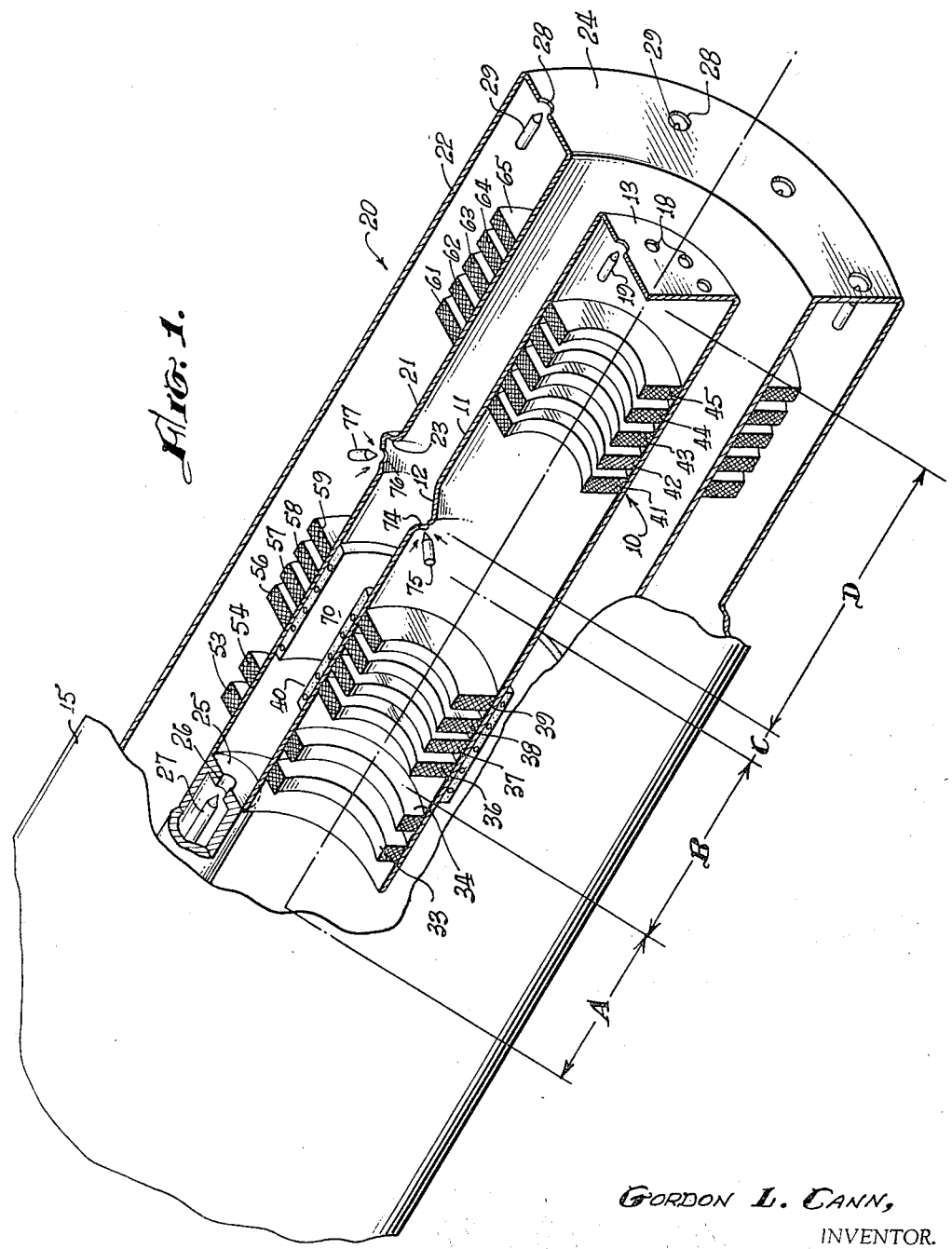

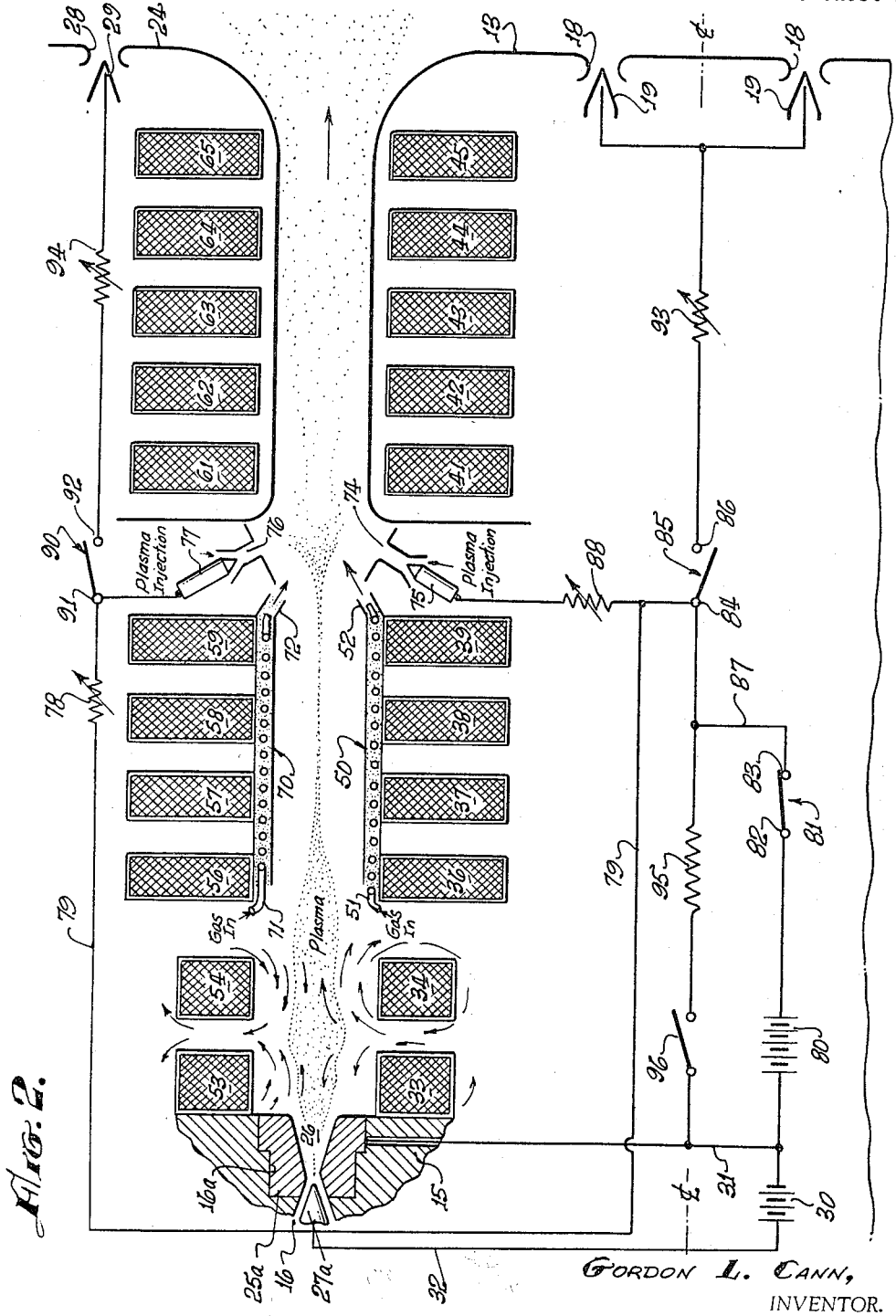

3,324,316
CONTROLLED FUSION DEVICES
Gordon L. Cann, Altadena, Calif., assignor to Electro-Optical Systems, Inc., Pasadena, Calif., a corporation of California
Filed June 8, 1964, Ser. No. 373,220
13 Claims. (Cl. 310—11)

This invention relates to nuclear fusion devices and more particularly to self-sustaining, controlled fusion devices useful for generating electrical energy at high power as well as for plasma acceleration.

The generation of electrical power from nuclear reactions has heretofore primarily involved fission reactions accompanied by the release of heat energy, the thermal energy then being converted to electrical energy by suitable means. However, it is possible for nuclear energy to be directly converted into electrical energy using nuclear fusion reactions, i.e., reactions involving the combination of light nuclei by a process of fusion. To be of practical value, the fusion reactions must be made to occur in such a manner that more energy is released than is consumed in initiating the reaction; in other words, the reactions must be self-sustaining.

The liberation of energy in fission is basically due to the binding energy per nucleon being less in the heavy elements than it is in those of intermediate mass number formed in fission, the fission process being one of subdivision involving a decrease of mass and a consequent liberation of energy. At the low mass number end of the system of elements similar circumstances arise in that the binding energy per nucleon in the lightest nuclei is, like that in the heaviest, less than for nuclei of intermediate mass number. Thus, the sum of the masses of individual light nuclei is more than would be the mass of the nucleus formed by their fusion, and the combination of light nuclei by a fusion process is known to result in a liberation of energy.

It is known that at extremely high temperatures, on the order of millions of degrees, a gas does not consist of molecules, but rather of a completely ionized system of positively charged nuclei and electrons, commonly referred to as a "plasma." Considerable research has been directed toward the production, heating, confinement and acceleration of gas plasmas.

The fusion process also shows great promise for use in the field of space propulsion. The thrust of a space propulsion system is dependent upon the product of the propellant mass flow rate and the exhaust velocity relative to the vehicle. The current use of chemical rocket fuels entails a limitation on space flights because the propellant exit velocities are relatively low and large masses of fuel must be carried aloft. Considerable thought has been given to the use of an ionized gas plasma in space propulsion systems with a view toward increasing the exhaust velocity of the propellant, together with a substantial reduction in fuel weight and space requirements as compared with chemical fuel.

Although nuclear reactors have heretofore been primarily of the fission type, the fusion process is particularly attractive for use in nuclear reactors because of the aforementioned possibility of direct conversion of nuclear energy into electrical energy, and for the additional reason that fusion reactors use a more plentiful fuel than that used in fission reactors. However, it has been heretofore extremely difficult to maintain the plasma in a stable condition for a long enough period of time to enable release of sufficient nuclear fusion energy to make the process self-sustaining and allow the direct conversion of the energy released in the fusion reaction into electrical energy. The present invention is directed toward surmounting this difficulty in order to provide a significant advance in the art by providing self-sustaining nuclear fusion devices which are compact and self-contained, thereby rendering them useful for space propulsion purposes as well as for the production of high power electrical energy.

Accordingly, it is an object of the present invention to provide improved controlled nuclear fusion devices.

It is also an object of the present invention to provide compact and self-contained controlled nuclear fusion devices.

It is another object of the present invention to provide improved self-sustaining controlled nuclear fusion devices.

It is a further object of the present invention to provide self-sustaining controlled nuclear fusion devices useful for the generation of high power electrical energy as well as for the acceleration of an ionized gas plasma to high velocities.

It is yet another object of the present invention to provide self-sustaining nuclear fusion devices capable of directly converting nuclear fusion energy into electrical energy.

It is a still further object of the present invention to provide a self-sustaining, high thrust electric propulsion system.

The objects of the present invention are accomplished by apparatus for producing, magnetically confining and heating the gas plasma to a temperature adequate to initiate a fusion reaction while accelerating the gas plasma to high velocities, for injecting additional mass into the gas stream and then decelerating it, for extracting electrical energy from the kinetic energy of the gas, and for feeding a part of the electrical output power back to that portion of the apparatus where plasma production and heating are occurring, thereby making the device self-sustaining. In addition to the extraction of electrical power from the devices, the expelled gas can be used for propulsion purposes. The present invention concept is based upon the technique of injecting an ionized gas plasma into a channel along which is maintained an axial electric discharge and magnetic fields with strong radial components, the tangential Hall currents which result from the axial current crossing the radial magnetic field lines being instrumental in confining the plasma, heating it to fusion temperatures and generating an E.M.F., as will be hereinbelow explained.

The presently preferred embodiment of such a present invention device utilizes concentric tubular casings defining an annular channel therebetween. The annular channel can be functionally divided into four consecutive sections: a plasma generating and heating section; a fusion reaction section; a supplymentary gas injection section; and a power generation section. In the first section a gas plasma is generated by arc jet apparatus, the plasma then passing through the remainder of the section in which is maintained an axial electric discharge and a magnetic field with strong radial components, the axial electric discharge also extending through the fusion reaction section. The axial current interacts with the radial components of the magnetic field to give tangential velocity to the gas and also to produce tangential Hall currents, the Hall currents then interacting with the radial components of the magnetic field to impart axial acceleration to the gas. The tangential Hall currents also interact with the axial components of the applied magnetic field to produce radially inwardly directed forces which confine the gas. Thus the magnetic field, acting in conjunction with the Hall currents, performs the dual function of providing magnetic confinement an axial acceleration of the gas plasma. In addition, the tangential Hall currents increase the gas temperature as the plasma passes through the heating section, this phenomenon being known as "ohmic heating."

The fusion reaction section includes a coil system for the production of an additional magnetic field having strong radial components, whereby the aforementioned interaction between the tangential Hall currents and the magnetic field increases the plasma confining force and causes further ohmic heating of the gas, the particle density being increased by the Hall currents sufficiently to bring about initiation of the fusion reaction. The fusion reaction section also includes a heat exchanger for recovering a large fraction of radiation and neutron energy, the neutrons being thermalized and the resulting thermal energy being transferred to the coolant fluid. The coolant fluid leaving the heat exchanger can be either passed through the power generation section and then exhausted to the ambient or bypassed around the power generation section and fed directly into the exhaust jet. Thus the plasma is heated and axially accelerated by Hall currents and subjected to an increasing elecrtical potential difference as it passes through the first two sections of the device.

In the supplementary gas injection section a certain minimum amount of additional mass is injected into the plasma flow, this additional mass being derived partly from the coolant of the energy recovery system or partly from secondary arc jets disposed in this third section, or all from the secondary arc jets.

The power generation section is provided with electromagnetic field coils which produce strong radial flux components and with means for extending the aforementioned axial electric discharge through this fourth section of the device, whereby additional Hall currents can be developed in this power generation section. However, enough additional mass was injected into the plasma as it enters the power generation section of the device to achieve a sufficiently higher ion density so that the tangential Hall currents induced in this section are reversed in direction from those induced in the plasma as it passed through the first and second sections of the device. This reversal of Hall current direction causese the axial E.M.F. induced by these Hall currents to be such that the electric field in the power generation section of the device is opposite to the direction of the axial electric field in the first two sections of the device. This gives rise to the desired generating action since the Hall currents result in axial deceleration of the plasma in this power generating section and since electrical energy can be extracted from the kinetic energy of the gas. Thus, in this power generating section the high random energy of the fusion reaction products is transferred to directed energy in the total gas flowing and then converted into electrical energy through magnetohydrodynamic (MHD) deceleration, the electrical potential of the gas stream being decreased as it passes through the power generation section.

External electrical circuitry is provided to utilize the E.M.F. generated in the power generation section to provide the electrical energy for heating of the gas plasma in the plasma generating and heating section of the device. An external load resistance can be inserted into the external circuitry so that the current flow therethrough causes a voltage drop for further utilization of the electrical energy created directly from nuclear energy.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:

FIGURE 1 is a partial perspective view, partially cut away, of a presently preferred embodiment of a nuclear fusion device; and, FIGURE 2 is a partial sectional view of the device of FIGURE 1, shown in combination with an electrical schematic diagram.

In order to heat a gas to extremely high temperatures at relatively high pressures, it is necessary to use a method of confinement wherein the gas does not touch any material boundaries. For a completely ionized gas, i.e., there is a possibility of magnetic confinement, and many magnetic confinement configurations have been developed and analyzed during the past few years. The present invention utilizes a magnetic confinement configuration based upon the use of Hall currents in an annular tube. In this configuration the Hall currents are instrumental not only in confining the plasma, but also in heating it and giving it axial momentum. Use of an annular channel configuration eliminates edge surfaces from the plasma sheet and the attendant confinement problem and need for electrodes to carry the Hall current.

Turning now to the drawing, in FIGURE 1 there is shown a partial perspective view of a presently preferred embodiment of a nuclear fusion device utilizing the present invention concepts. The basic structure of the illustrated device is composed of an inner cylindrical casing 10 coaxially disposed within an outer tubular casing 20, the space between them defining an annular channel. For clarity of explanation the structure is functionally divided into four consecutive sections; a plasma generating and heating section A, a fusion reaction section B, a supplementary gas injection section C, and a power generation section D. The extent of these four sections is generally indicated in FIGURE 1 by dimensional arrows. The inner casing 10 is hollow and of substantially uniform cross-section throughout sections A, B and D the casing wall 11 defining a circumferential groove 12 in section C. The outer casing 20 is in the form of a hollow tube defined by an inner longitudinal wall 21 and an outer longitudinal wall 22. The outer casing 20 is of substantially uniform cross-section throughout sections A, B and D, the inner wall 21 defining a circumferential groove 23 in section C. The casings 10 and 20 are mounted to an archead support structure 15 fabricated from a suitable electrical insulating material, such as Micarta.

Extending axially through the archead support structure 15 are a plurality of circumferentially spaced openings 16. In the presently preferred embodiment twelve of such openings 16 are utilized, the openings being equally spaced about the circumference of a circle centered in the annular space defined between the inner and outer casings (only one of such openings being shown in the drawings). Each of the openings 16 terminates in an enlarged end portion 16a. The plurality of openings 16 determine the location of a number of arc jet apparatus, as will be hereinbelow explained. A sufficient number of these circumferentially spaced arc jets must be utilized to achieve substantially symmetric behavior by forming a stable, annular plasma sheet. Although it is presently preferred to utilize twelve circumferentially spaced arc jets, substantially symmetric operation has been achieved in an annular Hall current accelerator using only five circumferentially spaced arc jets.

An annular anode plate 25, of varying thickness is mounted to the end of the archead support structure. The anode plate 25 is fabricated of metal, preferably copper, and is provided with a series of twelve circumferentially spaced cylindrical projections 25a, each of the cylindrical projections 25a mating with one of the enlarged end portions 16a in the archead support structure. The anode plate is provided with a series of twelve passageways 26, each of the passageways 26 extending coaxially through a different one of the cylindrical projections 25a, the openings 26 being tapered to form expansion nozzles.

Mounted within each of the openings 16 is a cylindrical cathode 27 fabricated of a suitable metal, with tungsten being presently preferred. Each of the cathodes 27 defines a tapered end portion to 27a in coaxial alignment with the expansion nozzle formed by the adjacent passageway 26. Each of the cathodes 27 is energized by a separate high voltage, direct current power supply connected between it and the anode plate 25. In FIGURE 2 of the drawing one of these power supplies is shown, indicated by the reference numeral 30, the power supply 30 being connected to the anode plate 25 by an electrical lead 31 and to the illustrated cathode 27 by an electrical lead 32.

The open volume defined between the tapered end portion 27a of each of the cathodes 27 and the tapered surfaces of the anode plate 25 defining the expansion nozzles forms a gas chamber. Plasma is produced within each of the gas chambers by pumping gas under pressure through suitable gas inlet passageways, not shown, in the archead support structure 15, and through an arc maintained between the cathode 27 and the anode plate 25, the plasma passing through the aforementioned expansion nozzle in the anode plate 25. Thus, twelve circumferentially spaced arc gap devices are provided within the archead support structure 15, each arc gap device being electrically energized by a separate power supply.

Mounted within the hollow interior portion of the inner casing 10 are a series of eleven magnetic field coils of annular configuration. Two coils, 33 and 34, are positioned within the plasma generating and heating section A. Four coils, 36–39, are positioned within the fusion reaction section B. Five coils, 41–45, are positioned within the power generating section D. These eleven coils are concentrically mounted within the inner casing 10 and insulated therefrom by suitable electrical insulating material.

In a similar manner, eleven more field coils are mounted within the annular space defined between the inner and outer walls of the outer casing 20. Thus, positioned within the plasma generating and heating section A are two coils, 53 and 54, these coils being in respective alignment with the coils 33 and 34. A series of four coils, 56–59, are positioned within the fusion reaction section B and respectively aligned with the coils 36–39. A series of five coils, 61–65, are positioned within the power generating section D and in respective alignment with the coils 41–45. Although eleven sets of concentrically mounted magnetic coils are shown in the drawings, the number and positioning of the coils will vary in different structural embodiments, and those skilled in the art will appreciate various other combinations within the scope of the present invention concepts upon explanation of the operation of the device. Closely encircling the inner casing 10, throughout the length of the fusion reaction section B, is an inner cooling jacket generally indicated by the reference numeral 50. The cooling jacket 50 is in the form of a heat exchanger and is provided with suitable passageways or tubing for the flow of coolant fluid therethrough, together with a coolant inlet 51 and a coolant outlet 52 (see FIGURE 2).

An outer tubular cooling jacket 70 is mounted to the inner wall 21 of the outer casing 20 within the fusion reaction section B. The outer cooling jacket 70 is also of the heat exchanger type and includes a coolant inlet 71 and a coolant outlet 72. The cooling jacket 50 and 70 are preferably in the form of an annular graphite body in which is embedded a tubular spiral type of heat exchanger coil. Other types of suitable heat recovery systems for neutron moderation and transfer of thermal energy will be apparent to those skilled in the art.

A series of equally spaced openings 74 are provided in the circumferential groove 12 defined by the casing wall 11, the openings 74 being angularly inclined to face the exit end of the device. The circumferential positioning of the openings 74 correspond generally with the circumferential positioning of the openings 16 in the archead support structure. Thus, there are twelve openings 74 in the illustrated embodiment. Insulatively mounted within the inner casing 10, adjacent each of the openings 74, is a cylindrical cathode 75, each of the cathodes 75 defining a conically tapered end portion position adjacent the opening 74 and in coaxial alignment therewith. The cathodes 75 are energized by a high voltage, D.C. power supply 80 (see FIGURE 2), the power supply 80 being connected to the anode plate 25 by means of the electrical lead 31 and to one terminal 82 of a S.P.S.T. switch 81. The terminal 83 of the switch 81 is connected to a terminal 84 of a S.P.S.T. switch 85 by an electrical lead 87. The twelve cathodes 75 are electrically connected in parallel and the parallel combination connected by means of an adjustable triming resistor 88 to the switch terminal 84. Thus, the cathodes 75 are connected to the power supply 80 through the series combination of the trimming resistor 88 and the switch 81.

A similar series of twelve equally spaced openings 76 are provided in the circumferential groove 23 defined by the inner wall 21 of the outer casing 20, the openings 76 being angularly inclined to face downstream toward the exit end of the device. The circumferential positioning of the openings 76 corresponds generally with the circumferential positioning of the openings 16 in the archead support structure. Insulatively mounted within the annular space defined between the walls 21 and 22 of the outer casing 20, adjacent each of the openings 76, is a cylindrical cathode 77. Each of the cathodes 77 defines a conically tapered end portion positioned adjacent the opening 76 and in coaxial alignment therewith.

The twelve cathodes 77 are electrically connected in parallel and the parallel combination connected to a terminal 91 of a S.P.S.T. switch 90, the other terminal of the switch 90 being identified by the reference numeral 92. The switch terminal 91 is connected to the switch terminal 84 by the series combination of an adjustable trimming resistor 78 and an electrical power lead 79.

The projecting end of the inner casing 10 is closed by an end wall 24. Extending axially through the end wall 24 are a series of twelve circumferentially spaced openings 28, the circumferential spacing of the openings 28 being in radial alignment with the series of openings 18 in the end wall 13 of the inner casing. Insulatively mounted within the annular space defined between the walls 21 and 22 of the outer casing 20, adjacent each of the openings 28, is a cylindrical cathode 29. Each of the cathodes 29 defines a conically tapered end portion positioned adjacent the opening 28 and in coaxial alignment therewith. The cathodes 29 are electrically connected in parallel, the parallel combination being connected to the switch terminal 92 by means of an adjustable trimming resistor 94.

Provision is made to utilize the electrical power generated by the device, the external load resistance being indicated by the reference numeral 95. The external load 95 is connected between the switch terminal 84 and the electrical lead 31 by means of a S.P.S.T. switch 96.

To begin operation of the device, assuming all of the switches to be open, the fuel or reactant is pumped under pressure into the openings 16 in the archead support structure through suitable gas inlet passageways (not shown). In order to initiate a fusion reaction the fuel must be of the aforementioned light nuclei type, such as deuterium, lithium, tritium or hydrogen, for example, or suitable combinations thereof. Plasma is created within the gas chambers formed between the conical tipped portions 27a of the cathodes 27 and the adjacent surfaces of the projecting portions 25a of the anode plate 26. Upon the closing of switch 81 secondary electrical sheet discharges are created by the arcs struck between the exposed surfaces of the anode plate 25a and the cathodes 75 and 77. The sheet discharge from the cathodes 75 to the anode plate forms a tubular sheath around the inner casing 10 and extending from the supplementary gas injection section C through the fusion reaction section B and the plasma generating the heating section A. A vacuum must be maintained within these first three sections of the device in order to prevent the electrical discharges from striking through the low impedance of the external electrical circuitry. The sheet discharge from the cathodes 77 forms a similarly extending tubular sheath adjacent the inner wall 21 of the outer casing 20. The current flows in the two sheet discharges are equalized by adjustment of the trimming resistors 78 and 88, these resistors being of extremely low resistance, less than $\frac{1}{100}$ ohm, and capable of carrying extremely high currents. The excitation of the coils 33 and 34 and that of the adjacent coils 53 and 54 is such that the current flow through the coils cause the radial magnetic field components in the annulus of the adjacent coils to add, as shown by the arrows in the diagram of FIGURE 2. There are then two magnetic force systems for confinement of the ionized gas. The current return circuits to the cathodes 75 and 77 are arranged such that the magnetic fields from the two sheath discharges interact with the current in the plasma to exert confining or "pinching" forces on the charged particles in the annulus. Secondly, the tangential Hall currents interact with the axial components of the applied magnetic fields (the magnetic fields of the coils 33, 34, 53 and 54) to exert radially inwardly directed forces on the plasma. The magnitude of these radial confining forces due to Hall currents drop to low values at various points along the channel. However, the relatively constant triaxial forces resulting from the axial electric current and the return current path augment the Hall current confining forces sufficiently to provide adequate overall confining forces throughout the length of the channel in sections A and B of the device.

In order to permit rapid heating of the plasma in sections A and B, while undergoing axial acceleration due to Hall currents, the ratio of the mass flow rate parameter to electric current must be much smaller than unity in these sectioins. That is, $$\frac{|e|\dot{m}}{m_a I} \ll 1$$

where $|e|$=electron charge (coulomb)
$\dot{m}$=mass flow rate (kilogram/second)
$m_a$=mass of atom (kilogram)
$I$=electric current (ampere).

Although the ions and electrons in the plasma become heated to extremely high temperatures, e.g., in excess of $10^{-7}$ ° K., as the plasma passes through the heating section, the electrons are prevented from "running away" by the strong radial components of the applied magnetic fields.

Stronger magnetic fields are produced within the fusion reaction section B by the inner coils 36–39 and the outer coils 56–59. These coils systems also provide strongly fringing magnetic fields, i.e., magnetic fields in which the total radial components of the magnetic lines of force greatly predominate over the axial components. The electrical excitation of these magnetic coils is arranged so that the radial components of adjacent coils reinforce each other. Therefore, the magnetic confining force on the plasma is increased as the plasma passes through section B. There is also a tendency for increase in the particle density. As the plasma heats, the Hall currents increase and produce stronger confining forces, which further tend to increase the particle density, thereby creating a regenerative effect. The increasing density and temperature eventually lead to initiation of the fusion reaction and, once the reaction begins, it becomes catalytic because of the regenerative effect, and large quantities of energy are released. Part of the released energy is absorbed by the plasma, and part is released as radiation and neutron kinetic energy. The heat exchangers of the cooling jackets 50 and 70 provide an energy recovery system for recapturing a large fraction of the released radiation and neutron energy. As the coolant fluid, either gas or liquid, passes through the heat exchangers it absorbs heat energy, the heated coolant then being injected into the power generating section D through the outlets 52 and 72 which, in FIGURE 2 of the drawing, are shown to exhaust directly into the annular accelerator channel. Alternatively, instead of passing the coolant through the power generating section D, it may be directly exhausted and expanded to the ambient tube to provide a propulsive force. In either case, the energy absorbed by the coolant in this energy recovery system is utilized to improve either the electrical generator performance or increase the thrust provided by the exhaust jet. The opeartion of the system, up to this point, is substantially identical to that of the Hall current generators disclosed in my copending U.S. patent application Ser. No. 217,631, filed Aug. 17, 1962, now Patent No. 3,243,954, entitled "Plasma Accelerator Using Hall Currents," that application containing a complete explanation and mathematical analysis of the operating principles of such Hall current accelerators.

In the supplementary gas injection section C, additional mass is injected into the plasma flow. The additional mass is provided by the injection of cold gas across the tips of the cathodes 75 and 77, remembering that electrical discharges have been struck from these cathodes. The cold gas is injected under pressure through suitable gas inlet passageways, not shown, across the tips of these cathodes and into the openings 74 and 76, thereby creating additional plasma at each of the cathode tips. As mentioned hereinabove, the additional mass injected into the plasma flow can be augmented by the cooling fluid flowing through the outlets 52 and 72, this cooling fluid having absorbed considerable energy in the fusion reaction section B. Enough mass is introduced into the system and ionized so that $$\frac{|e|\dot{m}\alpha}{m_a I} > 1$$

wherein: $\alpha$=percentage ionization in gas flow.

The introduction of additional mass per current flow at the inlet to the power generation section D allows operation of the device as an electrical generator rather than merely as an accelerator, as will now be explained.

The electrical excitation of the field coils 41–45 and 61–65 in the power generation section D is such that the radial components of the magnetic lines of force reinforce each other, in the manner illustrated in section A in FIGURE 2. For ease of illustration the electrical circuitry for excitation of the various field coils in sections A, B and D have not been shown, suitable circuitry being well known in the art. Suitable methods of constructing and winding such field coils to produce strong radial magnetic force components are also well known and are not themselves a part of the present invention. The electrical circuits to the cathodes 19 and 29 are completed by simultaneously closing the switches 85 and 90. These switches may be ganged together for convenience of operation. Closing of the switches 85 and 90 results in the application of an electrical potential to the cathodes 19 and 29 thereby resulting in an extension of the sheet discharges, formerly extending only to the cathodes 75 and 77, all the way through the power generation section D. Therefore, further tangential Hall currents will be induced in section D of the device. However, the Hall currents induced in the power generation section D are reversed in direction from the Hall currents induced in the plasma in sections A and B because of the higher ion density achieved by the injection of additional mass into the plasma as it enters the power generation section D. Whereas it was necessary to maintain the ratio of the mass flow rate parameter to electric current much smaller than unity in the plasma heating and fusion reaction regions of the device, sufficient additional mass is introduced into the plasma to increase this ratio to greater than unity in the power generation section to cause the desired reversal of direction of Hall currents induced in this section.

Due to the different direction of the Hall currents induced in section D, the radial Hall forces are no longer inwardly directed and no longer confining for the plasma. Therefore, the plasma in this section must be wall confined and the gas temperature near the walls must be maintained low enough to insure against wall erosion. A more important result of these outwardly directed radial forces is that the Hall currents induce an axial E.M.F. such that the electrical field in section D of the device is opposite to the direction of the axial field in sections A, B and C of the device, thereby resulting in axial deceleration of the gas and thereby producing the desired electrical generating action by decreasing the electrical potential of the gas as it passes through this last section of the device.

The switch 96 is then closed to connect the electrical load 95 and the switch 81 is opened, thereby disconnecting the power supply 80, the device now being self-sustaining by means of the electric potential developed in the power generating section D. The trimming resistors 93 and 94 are then adjusted so that current no longer flows through the cathodes 75 and 77, the electric discharges then extending all the way from the cathodes 19 and 29 to the anode plate 25. Thus, the plasma is increased in electrical potential as it passes through sections A and B of the device, the plasma simultaneously undergoing heating and Hall current acceleration, and then the plasma is then brought down in potential as it passes through the power generation section. Electrically speaking, this is analogous to two batteries connected in series opposition, the second battery (the potential drop in the plasma in the power generation section) being used to charge the first battery (supply the electrical power for heating the plasma in the heating and fusion sections), the use of MHD deceleration providing a direct conversion of nuclear energy into electrical energy. The load resistance 95 is provided for utilization of the large remaining quantity of electrical energy generated by the device.

The gas exhausted from the device provides sufficient force for propulsion purposes or as a driving force for turbines or other pressure operated devices. Thus, for example, the exhaust from the present invention device might be used to rotate a turbine driven generator for the creation of further electrical power.

The pointed cathodes 19 and 29, acting in conjunction with the curved surfaces of the end walls 13 and 24 can provide addition Hall current generation and even greater axial gas acceleration in these regions of expanding current at the channel exit in the manner disclosed in my aforementioned copending patent application. And, by tailoring the magnetic fields at the device exit to provide strong radial components extending some distance downstream of the end walls 13 and 24, a magnetic nozzle can be formed in the manner disclosed in my copending patent application Ser. No. 393,288, filed Aug. 31, 1964, entitled "Annular Magnetic Hall Current Accelerator."

The hereinabove described present invention embodiment possesses a number of practical advantages over present schemes for nuclear fusion reactors. The magnetic field requirements of the present invention device are modest (under 10,000 Gauss) and do not need to be superconducting. An additional advantage of the present invention confinement concept is that it possesses first order positional stability; if the hot plasma were displaced from the middle of the confinement zone by a small disturbance, it would return to the central location. Furthermore, although heating is accomplished in the present invention device with an electric discharge, the electrons are prevented from "running away" by the confining effect of the radial components of the applied magnetic fields.

In the hereinabove described embodiment magnetic fields having strong radial components are induced by inner and outer sets of concentric coils distributed along a common axis, the space between the inner and outer coil sets forming an annulus. Adjacent field coils are oppositely excited, while the inner and outer coils at any given axial position are excited in the same direction. Plasma is injected into the annulus from arc jets at one end, a strong axial current being passed through the plasma by establishing sheet discharges between the common anode of the arc jets at the inlet and a set of cathodes at the channel outlet. The tangential Hall currents which results from the axial current crossing the radial magnetic field lines are instrumental in confining the plasma, heating it to fusion temperatures and generating the E.M.F. in the generator section of the device. The device is useful as a compact, self contained electric fusion rocket engine as well as for the generation of electrical energy. When used as a fusion engine, its operation can be generally analogized with that of a turbojet engine, the axial current of the fusion engine corresponding to the shaft of a turbojet engine. The alternating Hall hoop currents near the inlet of the fusion engine correspond to the compressor in a turbojet engine in that the gas is heated and raised to a higher pressure in both types of engines, the fusion reaction being equivalent to the combustion reaction in a turbojet. In the fusion rocket, extra propellant is injected downstream of the reaction zone, whereas in the turbojet, fuel is injected upstream of the burner. The tangential Hall currents downstream of the injection region (i.e., in the power generator section) are analogous to the turbine blades of a turbojet which supply energy for the compressor. Thrust is provided in both devices by exhausting high velocity gas out of a rearwardly directed nozzle.

Thus there has been described a novel self-sustaining controlled nuclear fusion device in which the containment and heating of a gas plasma and electirc power generation are all accomplished through the use of Hall currents in an annular shaped channel along which is maintained an axial voltage gradient. Axial currents are produced by the axial voltage gradient, the axial currents interacting with the radial components of applied magnetic fields along the channel to thereby produce large tangential Hall currents. These tangential Hall currents in turn interact with the axial components of the applied magnetic fields to produce plasma confining forces. The applied magnetic fields are established so that adjacent field coils have opposite current directions. Hence the Hall currents alternate in direction and are instrumental in the heating and confinement of the plasma and in the generation of an E.M.F. In addition, there is a continuous flow of reactant or fuel through the device, thereby rendering it also useful as a self-contained electric fusion rocket engine for propelling large interplanetary space rockets.

The illustrated embodiment uses the plasma production and acceleration techniques disclosed in my aforementioned copending U.S. patent application No. 217,631, filed August 17, 1962, now Patent No. 3,243,954, these techniques being presently preferred because of their high efficiency and performance capabilities, most of the energy within the accelerator channel being in desirable forms. Of course, other techniques for plasma heating and acceleration could be utilized in lieu of that presently preferred and the modifications necessary to adapt other techniques will become apparent to those skilled in the art. For example, if a plasma acceleration technique is utilized wherein a significant portion of the energy is in the form of kinetic energy, it might be necessary to cause deceleration of the plasma before injecting it into the electrical generation section of the device. In such case, the deceleration would transform the kinetic energy into heat energy which would thereby make the gas even hotter to facilitate initiation of the fusion reaction.

Thus, although the invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

1. Nuclear fusion apparatus comprising, in combination:
   (a) means for generating a gas plasma from a mass of ionizable light nuclei gas and injecting the plasma onto a predetermined axis along which is maintained an axial electric discharge and a first magnetic field with sufficiently strong radial components so that interaction between the axial current and the radial components of said first magnetic field produces tangential Hall currents which axially accelerate said plasma, confine it along said predetermined axis and ohmically heat the plasma to a temperature sufficient to initiate a fusion reaction, said means maintaining the ratio of the plasma mass flow rate parameter to electric current less than unity;
   (b) injection means for introducing a predetermined mass of at least partially ionizable fluid into the gas stream at a predetermined point downstream of the region in which said fusion reaction occurs, said predetermined mass being sufficient to cause the ratio of the mass flow rate parameter of ionized gas to electric current to become greater than unity;
   (c) linear tubular casing means having substantially open ends and defining an inlet at one of its ends and an outlet at its other end, said tubular casing means being concentrically disposed along said predetermined axis with said inlet at said predetermined point;
   (d) means for extending said axial electric discharge along said predetermined axis through said tubular casing means;
   (e) electromagnetic means for maintaining a second magnetic field within said tubular casing and extending substantially therethrough, the total radial components of the magnetic lines of force of said second magnetic field within said tubular casing predominating sufficiently over the axial components so that the tangential Hall currents produced by the interaction of the radial magnetic field components with the axial electrical current will magnetohydrodynamically decelerate the gas in said tubular casing to directly convert the nuclear energy of the fusion reaction products of said gas into electrical energy;
   (f) means for expanding the gas from the outlet of said tubular casing to the ambient; and,
   (g) electrical circuit means for extracting electrical energy from the gas as it passes through said tubular casing.

2. Nuclear fusion apparatus comprising, in combination:
   (a) means for generating a gas plasma from a mass of ionizable light nuclei gas and injecting the plasma onto a predetermined axis along which is maintained an axial electric discharge and a first magnetic field with sufficiently strong radial components so that interaction between the axial current and the radial components of said first magnetic field produces tangential Hall currents which axially accelerate said plasma, confine it along said predetermined axis and ohmically heat the plasma to a temperature sufficient to initiate a fusion reaction, said means maintaining the ratio of the plasma mass flow rate parameter to electric current less than unity;
   (b) injection means for introducing a predetermined mass of at least partially ionizable fluid into the gas stream at a predetermined point downstream of the region in which said fusion reaction occurs, said predetermined mass being sufficient to cause the ratio of the mass flow rate parameter of ionized gas to electric current to become greater than unity;
   (c) linear tubular casing means having substantially open ends and defining an inlet at one of its ends and an outlet at its other end, said tubular casing means being concentrically disposed along said predetermined axis with said inlet at said predetermined point;
   (d) means for extending said axial electric discharge along said predetermined axis through said tubular casing means;
   (e) electromagnetic means for maintaining a second magnetic field within said tubular casing and extending substantially therethrough, the total radial components of the magnetic lines of force of said second magnetic field within said tubular casing predominating sufficiently over the axial components so that the tangential Hall currents produced by the interaction of the radial magnetic field components with the axial electrical current will magnetohydrodynamically decelerate the gas in said tubular casing to directly convert the nuclear energy of the fusion reaction products of said gas into electrical energy;
   (f) means for expanding the gas from the outlet of said tubular casing to the ambient; and
   (g) electrical circuit means for extracting electrical energy from said gas as it passes through said tubular casing and utilizing at least a portion of the extracted electrical energy to maintain said axial electric discharge.

3. Nuclear fusion apparatus comprising, in combination:
   (a) an accelerator structure including inner and outer tubular casings maintained in substantially coaxial alignment thereby defining an annular channel extending axially therebetween, said accelerator structure being generally divided into four longitudinally consecutive reference sections;
   (b) means for generating a gas plasma from a mass of ionizable light nuclei gas and injecting said gas plasma axially into said annular channel within the first section of said accelerator structure;
   (c) means for maintaining an axial electric discharge in the path of said gas plasma within said annular channel, said axial electric discharge extending throughout the first and second sections of said accelerator structure to thereby produce an axial voltage gradient therethrough, the ratio of the plasma mass flow rate parameter to electrical current being maintained significantly less than unity in the first and second sections of said accelerator structure;
   (d) means for maintaining a first magnetic field within said annular channel substantially throughout the first and second sections of said accelerator structure, the total radial components of the magnetic lines of force of said first magnetic field within said annular channel being sufficiently strong enough so that the tangential Hall currents resulting from the interaction of the radial magnetic components with the axial currents produced by the axial voltage gradient through said first and second sections will produce plasma confining forces while axially accelerating and ohmically heating the plasma to a temperature sufficient to initiate a fusion reaction;
   (e) means disposed in the third section of said accelerator structure for injecting a sufficient mass of at least partially ionizable fluid into the gas stream in the accelerator channel so that the ratio of the mass flow rate parameter of ionized gas to electric current becomes greater than unity;

(f) means for selectively extending said axial electric discharge in said accelerator channel through the fourth section of said accelerator structure to thereby produce an axial voltage gradient in said fourth section;

(g) means for maintaining a second magnetic field within said annular channel substantially throughout the fourth section of said accelerator structure, the total radial components of the magnetic lines of force of said second magnetic field within said annular channel being sufficiently strong enough so that the tangential Hall currents induced in said fourth section by interaction of the radial magnetic components of said second magnetic field with the axial currents produced by the axial voltages gradient through said fourth section will cause magnetohydrodynamic deceleration of the gas in the fourth section to directly convert the nuclear energy of the fusion reaction products of the gas into electrical energy;

(h) means for expanding the gas from the fourth section of said accelerator structure to the ambient; and, (i) electrical circuit means for extracting electrical energy from the gas as it passes through the fourth section of said accelerator structure and utilizing at least a portion of the extracted electrical energy to maintain said axial electric discharge.

4. Nuclear fusion apparatus comprising, in combination:

(a) an accelerator structure including inner and outer tubular casings maintained in substantially coaxial alignment thereby defining an annular channel extending axially therebetween, said accelerator structure being generally divided into four longitudinally consecutive reference sections;

(b) means for generating a gas plasma from a mass of ionizable light nuclei gas and injecting said gas plasma axially into said annular channel within the first section of said accelerator structure;

(c) heat exchanger means disposed along the casing surfaces defining said annular channel and extending substantially throughout the second section of said accelerator structure, said heat exchanger means including a coolant fluid inlet at the end of said heat exchanger means nearest said first section and a coolant fluid outlet extending into the third section of said accelerator structure;

(d) means for maintaining an axial electric discharge in the path of said gas plasma within said annular channel, said axial electric discharge extending throughout the first and second sections of said accelerator structure to thereby produce an axial voltage gradient therethrough, the ratio of the plasma mass flow rate parameter to electrical current being maintained significantly less than unity in the first and second sections of said accelerator structure;

(e) means for maintaining a first magnetic field within said annular channel substantially throughout the first and second sections of said accelerator structure, the total radial components of the magnetic lines of force of said first magnetic field within said annular channel being sufficiently strong enough so that the tangential Hall currents resulting from the interaction of the radial magnetic components with the axial currents produced by the axial voltage gradient through said first and second sections will produce plasma confining forces while axially accelerating and ohmically heating the plasma to a temperature sufficient to initiate a fusion reaction;

(f) means for injecting a stream of coolant fluid into the inlet of said heat exchanger means, whereby the coolant fluid will pass through the heat exchanger means and through said outlet;

(g) means disposed in the third section of said accelerator structure for selectively injecting the coolant fluid emerging from the outlet of said heat exchanger means into the gas stream in the accelerator channel together with a sufficient mass of at least partially ionizable fluid so that the ratio of the mass flow rate parameter of ionized gase to electric current becomes greater than unity;

(h) means for selectively extending said axial electric discharge in said accelerator channel through the fourth section of said accelerator structure to thereby produce an axial voltage gradient in said fourth section;

(i) means for maintaining a second magnetic field within said annular channel substantially throughout the fourth section of said accelerator structure, the total radial components of the magnetic lines of force of said second magnetic field within said annular channel being sufficiently strong enough so that the tangential Hall currents induced in said fourth section by interaction of the radial magnetic components of said second magnetic field with the axial currents produced by the axial voltage gradient through said fourth section will cause magnetohydrodynamic deceleration of the gas in the fourth section to directly convert the nuclear energy of the fusion reaction products of the gas into electrical energy;

(j) means for expanding the gas from the fourth section of said accelerator structure to the ambient; and, (k) electrical circuit means for extracting electrical energy from the gas as it passes through the fourth section of said accelerator structure and utilizing at least a portion of the extracted electrical energy to maintain said axial electric discharge.

5. Nuclear fusion apparatus comprising, in combination:

(a) means for generating a gas plasma from a mass of ionizable light nuclei gas and injecting the plasma at a first predetermined point onto a predetermined axis toward a second predetermined point on said axis;

(b) electric means for maintaining an axial electric discharge along said predetermined axis and extending between said first and second predetermined points, said electric means including a source of direct-current electrical potential coupled between anode means disposed at said first predetermined point and first cathode means disposed at said second predetermined point;

(c) first electromagnetic means for maintaining a first magnetic field between said first and second predetermined points, said first magnetic field having sufficiently strong radial components adjacent said predetermined axis so that interaction between the axial current and the radial components of said first magnetic field produces tangential Hall currents for axially accelerating said plasma, confining it along said predetermined axis and ohmically heating the plasma to a temperature sufficient to initiate a fusion reaction;

(d) means for maintaining the ratio of the plasma mass flow rate parameter to electric current less than unity between said first and second predetermined points;

(e) injection means for introducing a predetermined mass of at least partially ionizable fluid into the gas stream at said second predetermined point, said predetermined mass being sufficient to cause the ratio of the mass flow rate parameter of ionized gas to electric current to become greater than unity;

(f) linear tubular casing means having substantially open ends and defining an inlet at one of its ends and an outlet at its other end, said tubular casing means being disposed along said predetermined axis with said inlet at said second predetermined point and with said predetermined axis extending longitudinally through the tube defined by said casing means;

(g) second cathode means disposed within said tubuar casing means at said outlet;

(h) means for selectively electrically connecting said second cathode means to said first cathode means for extending said axial electric discharge through said tubular casing means to said second cathode means;

(i) second electromagnetic means for maintaining a second magnetic field within said tubular casing means and extending substantially therethrough, the total radial components of the magnetic lines of force of said second magneic field within said tubular casing being sufficient so that the tangential Hall currents produced by the interaction of the radial magnetic field components of said second magnetic field with the axial electric current within said casing means will magnetohydrodynamically decelerate the gas in said casing means to directly convert the nuclear energy of the fusion reaction products of said gas into electrical energy;

(j) means for expanding the gas from the outlet of said tubular casing means to the ambient; and, (k) means for selectively connecting an electrical load resistance between said anode means and said first cathode means and for selectively disconnecting said source of D.C. electrical potential from between said anode means and said first cathode means.

6. Nuclear fusion apparatus comprising, in combination:

(a) linear tubular casing means having substantially open ends and defining an inlet at one of its ends and an outlet at its other end, said casing means being divided into four longitudinally consecutive reference sections with the first section at said inlet and the fourth section at said outlet;

(b) means for generating a gas plasma from a mass of ionizable light nuclei gas and injecting the plasma into the inlet of said tubular casing means into a predetermined axis extending longitudinally through the tube defined by said casing means;

(c) electric means for maintaining an axial electric discharge along said predetermined axis, said electric means including a source of direct-current electrical potential coupled between anode means disposed in said first section at said inlet and first cathode means disposed in said third section;

(d) first electromagnetic means for maintaining a first magnetic field within said tubular casing means and extending substantially throughout said first section, said first magnetic field having sufficiently strong radial components adjacent said predetermined axis so that interaction between the axial current and the radial components of said magnetic field produces tangential Hall currents for axially accelerating said plasma, confining said plasma along said predetermined axis and ohmically heating said plasma;

(e) second eletromagnetic means for maintaining a second magnetic field within said tubular casing means and extending substantially throughout said second section, said second magnetic field having sufficiently strong radial components adjacent said predetermined axis so that interaction between the axial current and the radial components of said second magnetic field produces tangential Hall currents in said second section for further axially accelerating said plasma and confining it along said predetermined axis, and for further ohmically heating the plasma to a temperature sufficient to initiate a fusion reaction;

(f) means for maintaining the ratio of the plasma mass flow rate parameter to electric current less than unity throughout the first and second sections of said tubular casing means;

(g) injections means for introducing a predetermined mass of at least partially ionizable fluid into the gas stream in the third section of said tubular casing means, said predetermined mass being sufficient to cause the ratio of the mass flow rate parameter of ionized gas to electric current to become greater than unity;

(h) second cathode means disposed within the fourth section of said casing means at said outlet;

(i) means for selectively electrically connecting said second cathode means to said first cathode means for extending said axial electric discharge through said fourth section to said second cathode means;

(j) third electromagnetic means for maintaining a third magnetic field within said tubular casing means and extending substantially throughout said fourth section, the total radial components of the magnetic lines of force of said third magnetic field within the fourth section of said tubular casing being sufficient so that the tangential Hall currents produced by the interaction of the radial magnetic field components of said third magnetic field with the axial electric current within the fourth section of said tubular casing means will magnetohydrodynamically decelerate the gas in said fourth section to directly convert the nuclear energy of the fusion reaction products of said gas into electrical energy;

(k) means for expanding the gas stream from the outlet of said tubular casing means to the ambient; and, (l) means for selectively connecting an electrical load resistance between said anode means and said first cathode means and for selectively disconnecting said source of D.C. electrical potential from between said anode means and said first cathode means.

7. Nuclear fusion apparatus comprising, in combination:

(a) linear tubular casing means having substantially open ends and defining an inlet at one of its ends and an outlet at its other end, said casing means being divided into four longitudinally consecutive reference sections with the first section at said inlet and the fourth section at said outlet;

(b) means for generating a gas plasma from a mass of ionizable light nuclei gas and injecting the plasma into the inlet of said tubular casing means onto a predetermined axis extending longitudinally through the tube defined by said casing means;

(c) electric means for maintaining an axial electric discharge along said predetermined axis, said electric means including a source of direct-current electrical potential coupled between anode means disposed in said first section at said inlet and first cathode means disposed in said third section;

(d) first electromagnetic means for maintaining a first magnetic field within said tubular casing means and extending substantially throughout said first section, said first magnetic field having sufficiently strong radial components adjacent said predetermined axis so that interaction between the axial current and the radial components of said first magnetic field produces tangential Hall currents for axially accelerating said plasma, confining said plasma along said predetermined axis and ohmically heating said plasma;

(e) second electromagnetic means for maintaining a second magnetic field within said tubular casing means and extending substantially throughout said second section, said second magnetic field having sufficiently strong radial components adjacent said predetermined axis so that interaction between the axial current and the radial components of said second magnetic field produces tangential Hall currents in said second section for further axially accelerating said plasma and confining it along said predetermined axis, and for further ohmically heating the plasma to a temperature sufficient to initiate a fusion reaction;
(f) heat exchanger means disposed along the inner wall surface of said tubular casing means and extending substantially throughout said second section, said heat exchanger means including a coolant fluid inlet at the end of said heat exchanger means nearest said first section and a coolant fluid outlet extending into said third section;
(g) means for maintaining the ratio of the plasma mass flow rate parameter to electric current less than unity throughout the first and second sections of said tubular casing means;
(h) means for injecting a stream of coolant fluid into the inlet of said heat exchanger means, whereby the coolant fluid will pass through the heat exchanger means and through its outlet;
(i) means disposed in the third section of said tubular casing means for selectively injecting the coolant fluid emerging from the outlet of said heat exchanger means into the gas stream in said third section together with a sufficient mass of at least partially ionizable fluid so that the ratio of the mass flow rate parameter of ionized gas to electric current becomes greater than unity;
(j) second cathode means disposed within the fourth section of said casing means at said outlet;
(k) means for selectively electrically connecting said second cathode means to said first cathode means for extending said axial electric discharge through said fourth section to said second cathode means;
(l) third electromagnetic means for maintaining a third magnetic field within said tubular casing means and extending substantially throughout said fourth section, the total radial components of the magnetic lines of force of said third magnetic field within the fourth section of said tubular casing being sufficient so that the tangential Hall currents produced by the interaction of the radial magnetic field components of said third magnetic field with the axial electric current within the fourth section of said tubular casing means will magnetohydrodynamically decelerate the gas in said fourth section to directly convert the nuclear energy of the fusion reaction products of said gas into electrical energy;
(m) means for expanding the gas stream from the outlet of said tubular casing means to the ambient; and,
(n) means for selectively connecting an electrical load resistance between said anode means and said first cathode means and for selectively disconnecting said source of D.C. electrical potential from between said anode means and said first cathode means.

8. Nuclear fusion apparatus comprising, in combination:
(a) linear tubular casing means having substantially open ends and defining an inlet at one of its ends and an outlet at its other end, said casing means being divided into four longitudinally consecutive reference sections with the first section at said inlet and the fourth section at said outlet;
(b) means for generating a gas plasma from a mass of ionizable light nuclei gas and injecting the plasma into the inlet of said tubular casing means onto a predetermined axis extending longitudinally through the tube defined by said casing means;
(c) electric means for maintaining an axial electric discharge along said predetermined axis, said electric means including a source of direct-current electrical potential coupled between anode means disposed in said first section at said inlet and first cathode means disposed in said third section;
(d) first electromagnetic means for maintaining a first magnetic field within said tubular casing means and extending substantially throughout said first section, said first magnetic field having sufficiently strong radial components adjacent said predetermined axis so that interaction between the axial current and the radial components of said first magnetic field produces tangential Hall currents for axially accelerating said plasma, confining said plasma along said predetermined axis and ohmically heating said plasma;
(e) second electromagnetic means for maintaining a second magnetic field within said tubular casing means and extending substantially throughout said second section, said second magnetic field having sufficiently strong radial components adjacent said predetermined axis so that interaction between the axial current and the radial components of said second magnetic field produces tangential Hall currents in said second section for further axially accelerating said plasma and confining it along said predetermined axis, and for further ohmically heating the plasma to a temperature sufficient to initiate a fusion reaction;
(f) heat exchanger means disposed along the inner wall surface of said tubular casing means and extending substantially throughout said second section, said heat exchanger means including a coolant fluid inlet at the end of said heat exchanger means nearest said first section and a coolant fluid outlet extending into said third section;
(g) means for maintaining the ratio of the plasma mass flow rate parameter to electric current less than unity throughout the first and second sections of said tubular casing means;
(h) injection means for introducing a predetermined mass of at least partially ionizable fluid into the gas stream in the third section of said tubular casing means, said predetermined mass being sufficient to cause the ratio of the mass flow rate parameter of ionized gas to electric current to become greater than unity;
(i) second cathode means disposed within the fourth section of said casing means at said outlet;
(j) means for selectively electrically connecting said second cathode means to said first cathode means for extending said axial electric discharge through said fourth section to said second cathode means;
(k) third electromagnetic means for maintaining a third magnetic field within said tubular casing means and extending substantially throughout said fourth section, the total radical components of the magnetic lines of force of said third magnetic field within the fourth section of said tubular casing being sufficient so that the tangential Hall currents produced by the interaction of the radial magnetic field components of said third magnetic field with the axial electric current within the fourth section of said tubular casing means will magnetohydrodynamically decelerate the gas in said fourth section to directly convert the nuclear energy of the fusion reaction products of said gas into electrical energy;
(l) conduit means coupling the outlet of said heat exchanger means to the outlet of said tubular casing means for injecting the coolant fluid emerging from said heat exchanger means into the gas stream at the outlet of said tubular casing means;
(m) means for expanding the gas stream from the outlet of said tubular casing means to the ambient; and,
(n) means for selectively connecting an electrical load resistance between said anode means and said first cathode means and for selectively disconnecting said source of D.C. electrical potential from between said anode means and said first cathode means.

9. Nuclear fusion apparatus comprising, in combination:
(a) an accelerator structure including inner and outer tubular casings maintained in substantially coaxial alignment thereby forming an annular channel extending axially therebetween, said casings having substantially open ends and defining a channel inlet at one end and a channel outlet at the other end, said accelerator structure defining four longitudinally consecutive reference sections with the first section at said channel inlet and the fourth section at said channel outlet;

(b) closure means transversely mounted to said accelerator structure to provide an air-tight seal across said channel inlet, said closure means including a gas inlet communicating with said channel inlet;

(c) means for generating a gas plasma from a mass of ionizable light nuclei gas and injecting said gas plasma through the gas inlet in said closure means and axially into said annular channel within the first section of said accelerator structure;

(d) electric means for maintaining an axial electric discharge within said annular channel in the path of said gas palsma, said electric means including a source of direct-current electrical potential coupled bewteen anode means encircling the gas inlet in said closure means and first cathode means disposed in the third section of said accelerator structure;

(e) first electromagnetic means for maintaining a first magnetic field within said annular channel substantially throughout the first section of said accelerator structure, the total radial components of the magnetic lines of force of said first magnetic field throughout the first section of said annular channel sufficiently predominating over the axial components so that the interaction of the radial components with the axial currents produced by the axial voltage gradient through said first section will produce tangential Hall currents for axially accelerating, confining and ohmically heating said plasma;

(f) second electromagnetic means for maintaining a second magnetic field within said annular channel substantially throughout the second section of said accelerator structure, the total radial components of the magnetic lines of force of said second magnetic field throughout the second section of said annular channel sufficiently predominating over the axial components so that the interaction of the radial components with the axial currents produced by the axial voltage gradient through said second section will produce tangential Hall currents for further axially accelerating and confining said plasma, and for further ohmically heating the plasma to a temperature sufficient to initiate a fusion reaction;

(g) means for maintaining the ratio of the plasma mass flow rate parameter to electrical current less than unity throughout the first and second sections of said accelerator structure;

(h) injection means for introducing a predetermined mass of at least partially ionizable fluid into the gas stream in the third section of said accelerator structure, said predetermined mass being sufficient to cause the ratio of the mass flow rate parameter of ionized gas to electric current to become greater than unity;

(i) second cathode means disposed within the fourth section of said accelerator structure at said channel outlet;

(j) means for selectively electrically connecting said second cathode means to said first cathode means for extending said axial electric discharge through said fourth section to said second cathode means;

(k) third electromagnetic means for maintaining a third magnetic field within said annular channel substantially throughout the fourth section of said accelerator structure, the total radial components of the magnetic lines of force of said third magnetic field throughout the fourth section of said annular channel sufficiently predominating over the axial components so that the tangential Hall currents produced by the interaction of the radial magnetic field components of said third magnetic field with the axial electric current within the fourth section of said accelerator channel will magnetohydrodynamically decelerate the gas in said fourth section to directly convert the nuclear energy of the fusion reaction products of said gas into electrical energy;

(l) means for expanding the gas stream from the channel outlet of said accelerator structure to the ambient; and, (m) means for selectively connecting an electrical load resistance between said anode means and said first cathode means and for selectively disconnecting said source of D.C. electrical potential from between said anode means and said first cathode means.

10. Nuclear fusion apparatus comprising, in combination:

(a) an accelerator structure including inner and outer tubular casings maintained in substantially coaxial alignment thereby forming an annular channel extending axially therebetween, said casings having substantially open ends and defining a channel inlet at one end and a channel outlet at the other end, said accelerator structure defining four longitudinally consecutive reference sections with the first section at said channel inlet and the fourth section at said channel outlet;

(b) closure means transversely mounted to said accelerator structure to provide an air-tight seal across said channel inlet, said closure means including a gas inlet communicating with said channel inlet;

(c) means for generating a gas plasma from a mass of ionizable light nuclei gas and injecting said gas plasma throuh the gas inlet in said closure means and axially into said annular channel within the first section of said accelerator structure;

(d) electric means for maintaining an axial electric discharge within said annular channel in the path of said gas plasma, said electric means including a source of direct-current electrical potential coupled between anode means encircling the gas inlet in said closure means and first cathode means disposed in the third section of said accelerator structure;

(e) first electromagnetic means for maintaining a first magnetic field within said annular channel substantially throughout the first section of said accelerator structure, the total radial components of the magnetic lines of force of said first magnetic field throughout the first section of said annular channel sufficiently predominating over the axial components so that interaction of the radial components with the axial currents produced by the axial voltage gradient through said first section will produce tangential Hall currents for axially accelerating, confining and ohmically heating said plasma;

(f) second electromagnetic means for maintaining a second magnetic field within said annular channel substantially throughout the second section of said accelerator structure, the total radial components of the magnetic lines of force of said second magnetic field throughout the second section of said annular channel sufficiently predominating over the axial components so that the interaction of the radial components with the axial currents produced by the axial voltage gradient through said second section will produce tangential Hall currents for further axially accelerating and confining said plasma, and for further ohmically heating the plasma to a temperature sufficient to initiate a fusion reaction;

(g) first heat exchanger means disposed along the outer wall surface of said inner tubular casing and extending substantially throughout said second section, said first heat exchanger means including a coolant fluid first inlet at the end of said first heat exchanger means nearest said first section and a coolant fluid first outlet extending into said third section;

(h) second heat exchanger means disposed along the inner wall surface of said outer tubular casing and extending substantially throughout said second section, said second heat exchanger means including a coolant fluid second inlet at the end of said second heat exchanger means nearest said first section and a coolant fluid second outlet extending into said third section;

(i) means for maintaining the ratio of the plasma mass flow rate parameter to electrical current less than unity throughout the first and second sections of said accelerator structure;

(j) means for injecting a stream of coolant fluid into the coolant fluid inlets of said first and second heat exchanger means, whereby the coolant fluid will pass through said first and second heat exchanger means and through their outlets;

(k) means disposed in the third section of said accelerator structure for selectively injecting the coolant fluid emerging from said coolant fluid first and second outlets of said first and second heat exchanger means into the gas stream in said third section together with a sufficient mass of at least partially ionizable fluid so that the ratio of the mass flow rate parameter of ionized gas to electric current becomes greater than unity;

(l) second cathode means disposed within the fourth section of said accelerator structure at said channel outlet;

(m) means for selectively electrically connecting said second cathode means to said first cathode means for extending said axial electric discharge through said fourth section to said second cathode means;

(n) third electromagnetic means for maintaining a third magnetic field within said annular channel substantially throughout the fourth section of said accelerator structure, the total radial components of the magnetic lines of force of said third magnetic field throughout the fourth section of said annular channel sufficiently predominating over the axial components so that the tangential Hall currents produced by the interaction of the radial magnetic field components of said third magnetic field with the axial electric current within the fourth section of said accelerator channel will magnetohydradynamically decelerate the gas in said fourth section to directly convert the nuclear energy of the fusion reaction products of said gas into electrical energy;

(o) means for expanding the gas stream from the channel outlet of said accelerator structure to the ambient; and, (p) means for selectively connecting an electrical load resistance between said anode means and said first cathode means and for selectively disconnecting said source of D.C. electrical potential from between aid anode means and said first cathode means.

11. Nuclear fusion apparatus comprising, in combination:

(a) electrically powered means for generating a gas plasma from a mass of ionizable light nuclei gas, accelerating the gas plasma and magnetically confining it along a first portion of a predetermined path while heating the plasma sufficiently to initiate a fusion reaction, said means maintaining the ratio of the plasma mass flow rate parameter to electric current less than unity;

(b) injection means for introducing a predetermined mass of at least partially ionizable fluid into the gas stream at a point on said predetermined path intermediate said first path portion and a subsequent second path portion, said predetermined mass being sufficient to cause the ratio of the ionized gas mass flow rate parameter to electric current to become greater than unity;

(c) electromagnetic means for magnetohydrodynamically decelerating the gas along said subsequent second path portion, said electromagnetic means including means for maintaining an axial electric discharge and a magnetic field along said second path portion, the total radial components of the magnetic lines of force of said magnetic field along said second path portion predominating sufficiently over the axial components so that the tangential Hall currents produced by the interaction of the radial magnetic field components with the axial electrical current will magnetohydrodynamically decelerate the gas along said second path portion to directly convert the nuclear energy of the fusion reaction product of said gas into electrical energy; and, (d) electrical circuit means partially disposed along said predetermined path for extracting electrical energy from said gas as it passes through said second path portion.

12. The nuclear fusion apparatus specified in claim 11, wherein said electrical circuit means includes means for coupling at least a portion of the extracted electrical energy to said electrically powered means to provide the electrical operating power therefor.

13. The nuclear fusion apparatus specified in claim 12, wherein said electromagnetic means further includes means for expanding said gas to the ambient at the downstream end of said second path portion.

References Cited

UNITED STATES PATENTS

| 2,992,345 | 7/1961 | Hansen | 176—5 |
| 3,093,569 | 6/1963 | Post | 176—5 |
| 3,113,427 | 12/1963 | Meyer | 176—1 X |
| 3,163,798 | 12/1964 | Salz et al. | 176—1 X |
| 3,170,841 | 2/1965 | Post | 176—7 X |
| 3,212,974 | 10/1965 | Le Boutet et al. | 176—5 |

FOREIGN PATENTS

| 1,271,729 | 8/1961 | France. |
| 1,344,319 | 10/1963 | France. |

REUBEN EPSTEIN, *Primary Examiner.*